May 22, 1923.
J. POTTS
FLYTRAP
Filed Feb. 7, 1921
1,455,808
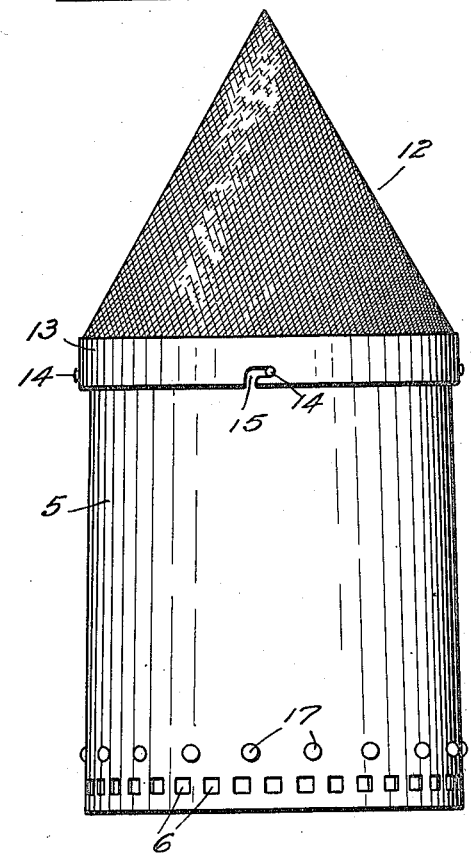
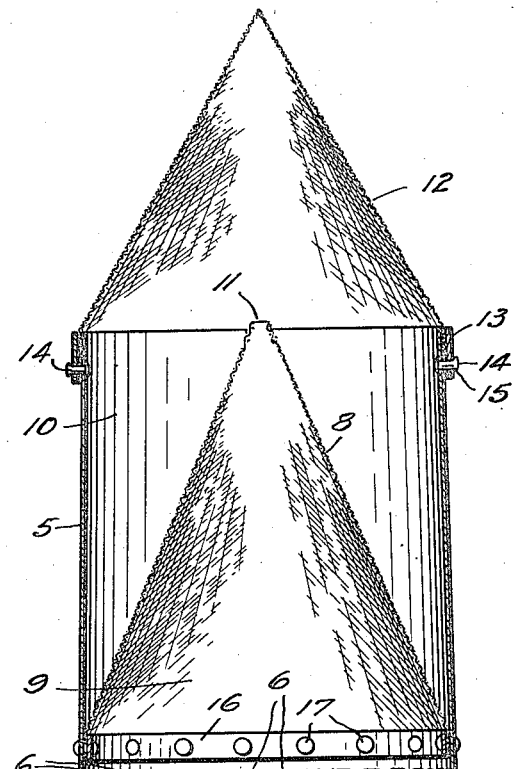
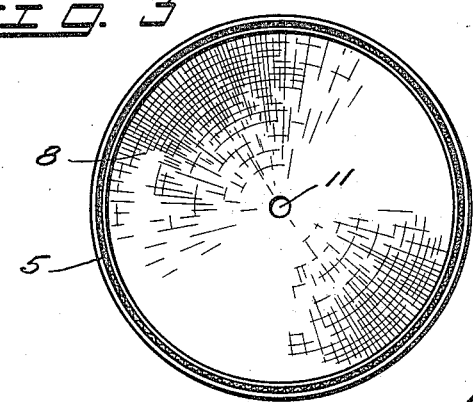
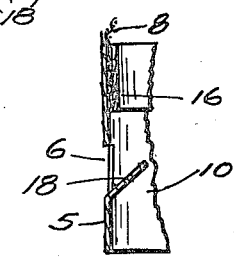
INVENTOR:
James Potts
by
Pierre Barnes
ATTORNEY Patented May 22, 1923.

1,455,808

UNITED STATES PATENT OFFICE.

JAMES POTTS, OF SEATTLE, WASHINGTON.

FLYTRAP.

Application filed February 7, 1921. Serial No. 443,236.

*To all whom it may concern:*

Be it known that I, JAMES POTTS, a subject of the King of England, residing at Seattle, in the county of King and State of Washington, have invented certain new and useful Improvements in Flytraps, of which the following is a specification.

This invention relates to insect-traps and its object is to provide an inexpensively constructed and peculiarly efficient trap for catching flies and other insects.

The invention consists in the novel construction, combination and arrangement of parts as will be hereinafeer described and claimed.

In the accompanying drawings,—

Figure 1 is an elevation of a trap embodying my invention. Fig. 2 is a vertical section of the same. Fig. 3 is an underside view. Fig. 4 is a fragmentary sectional view of the trap.

A fly-trap constructed according to my invention comprises a tubular body portion 5 formed of sheet metal or other opaque material, said body is open at its top and bottom and is provided near its lower end with circumferentially disposed openings 6 for the admission of flies.

Provided interiorly of said body and extending from a short distance above the inlet openings 6 to approximately the elevation of the upper edge of the body 5 is a cone shaped partition 8 of wire gauze dividing the trap into compartments 9 and 10 having connection with each other by a passage 11 provided at the cone apex.

The top of the compartment 10 is constituted by a cone shaped cap 12 of wire gauze provided about the periphery of its base with a collar 13 to fit over the upper end of the body 5.

For detachably connecting the cap to the trap body the latter is provided with spaced studs 14 which are engageable in angular shaped notches 15 provided in the cap ring to afford a readily separable connection of the "bayonet-joint" type.

The conical partition 8, as shown in Fig. 2, is fixedly secured in place between the body wall and a ring 16 by means of rivets 17 or an equivalent.

In order that flies may more readily enter the trap and to deter their leaving the same through openings 6, I provide within the compartment 9 a platform 18 for each of the said openings. Said platforms being formed by pressing inwardly tongue-like portions of all of the material punched from the body wall in producing the openings 6. Said tongues or platforms are, moreover, arranged to incline upwardly at an angle of approximately forty-five degrees so that flies in traveling toward the center of the trap upon the upper or lower surfaces of the platforms will be directed upwardly.

In operation, a saucer of sour milk, tainted meat or other suitable fly-bait is placed in the bottom of the lower compartment 9 to entice flies into the same through the inlets 6. Flies thus entering the trap usually ascend toward the light and are entrapped in the compartment 10 and in which they are most conveniently destroyed by hot water poured through the upper cone.

Should any of the flies undertake to find egress through the inlets the aforesaid platforms divert them toward the trap axis. An additional function of the platforms is that the same provides landings for flies thereby enabling the inlets being of smaller sizes and obviating thin edges which would be not only difficult for flies to pass over but generally serve to discourage the passage of flies into a trap.

The operation and advantages of the invention will be understood from the foregoing description.

What I claim, is,—

A fly-trap comprising an opaque tubular body, a conical cap of wire gauze detachably connected to the upper end of said body and a conical partition of wire gauze provided within the body and having a passage-way at its apex between the compartments above and below the partition, said partition having its lower end secured to the body adjacent to the lower end of the latter and having its upper end located at approximately the elevation of the upper end of the body, said body being provided below the partition with circumferentially arranged inlets produced by punching from the body tongues which extend inwardly and upwardly from the bottom of the edges of said inlets being coextensive with the periphery of the body.

Signed at Seattle, Washington, this 29th day of January, 1921.

JAMES POTTS.

Witnesses:
PIERRE BARNES,
MARGARET G. SUPPLE.